(12) United States Patent
Pajevic et al.

(10) Patent No.: US 12,472,772 B1
(45) Date of Patent: Nov. 18, 2025

(54) SELF-POSITIONING SWIVEL CASTER MECHANISMS

(71) Applicant: Amazon Technologies, Inc., Seattle, WA (US)

(72) Inventors: Dragan Pajevic, Arlington, MA (US); Tim Martin, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 1457 days.

(21) Appl. No.: 16/787,930

(22) Filed: Feb. 11, 2020

Related U.S. Application Data

(60) Provisional application No. 62/951,589, filed on Dec. 20, 2019.

(51) Int. Cl.
| | |
|---|---|
| *B60B 33/00* | (2006.01) |
| *B60B 33/02* | (2006.01) |
| *B60P 1/02* | (2006.01) |
| *B62B 3/00* | (2006.01) |
| *G05D 1/00* | (2006.01) |

(52) U.S. Cl.
CPC ...... *B60B 33/0068* (2013.01); *B60B 33/0049* (2013.01); *B60B 33/0057* (2013.01); *B60B 33/025* (2013.01); *B60B 33/026* (2013.01); *B60P 1/02* (2013.01); *B62B 3/002* (2013.01); *G05D 1/021* (2013.01); *B60B 2200/43* (2013.01); *B62B 2301/0465* (2013.01)

(58) Field of Classification Search
CPC ............ B60B 33/0068; B60B 33/0049; B60B 33/0057; B60B 33/025; B60B 33/026; B60B 2200/43; B60P 1/02; B62B 3/002; B62B 2301/0465; G05D 1/021
USPC ........................................................ 180/19.1
See application file for complete search history.

(56) References Cited

U.S. PATENT DOCUMENTS

2009/0066150 A1\* 3/2009 O'Rourke, Sr. .... B60B 33/0049
280/87.01

\* cited by examiner

*Primary Examiner* — Valentin Neacsu
*Assistant Examiner* — Felicia L. Brittman-Alabi
(74) *Attorney, Agent, or Firm* — Athorus, PLLC

(57) ABSTRACT

A self-positioning swivel caster may include a swivel mechanism that defines a home position of the caster. The swivel mechanism may include a compression spring, an upper cam, and a lower cam that is coupled to the caster wheel, in which the upper and lower cams include mating surfaces that define the home position. A bias force applied by the compression spring to the upper cam may cause rotation of the lower cam to the home position. When coupled to mobile containers, self-positioning swivel casters in home positions may increase clearance under the mobile containers for robotic drive units or other material handling equipment used to move the mobile containers, and the self-positioning swivel casters in home positions may also prevent drift or rolling of the mobile containers away from current locations.

20 Claims, 8 Drawing Sheets

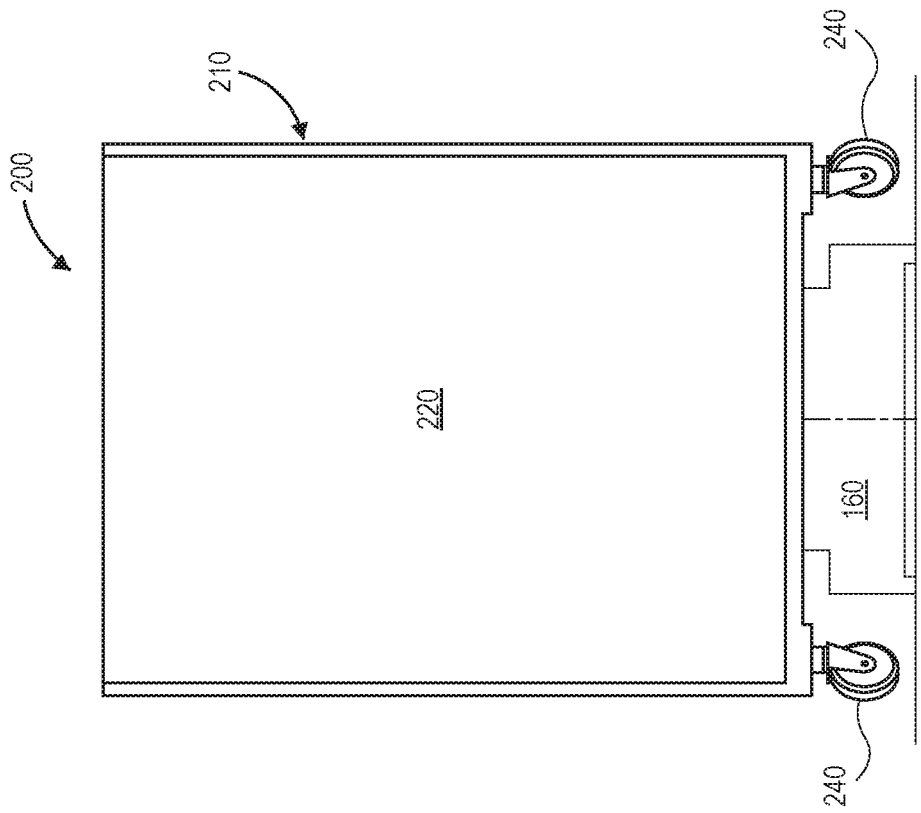
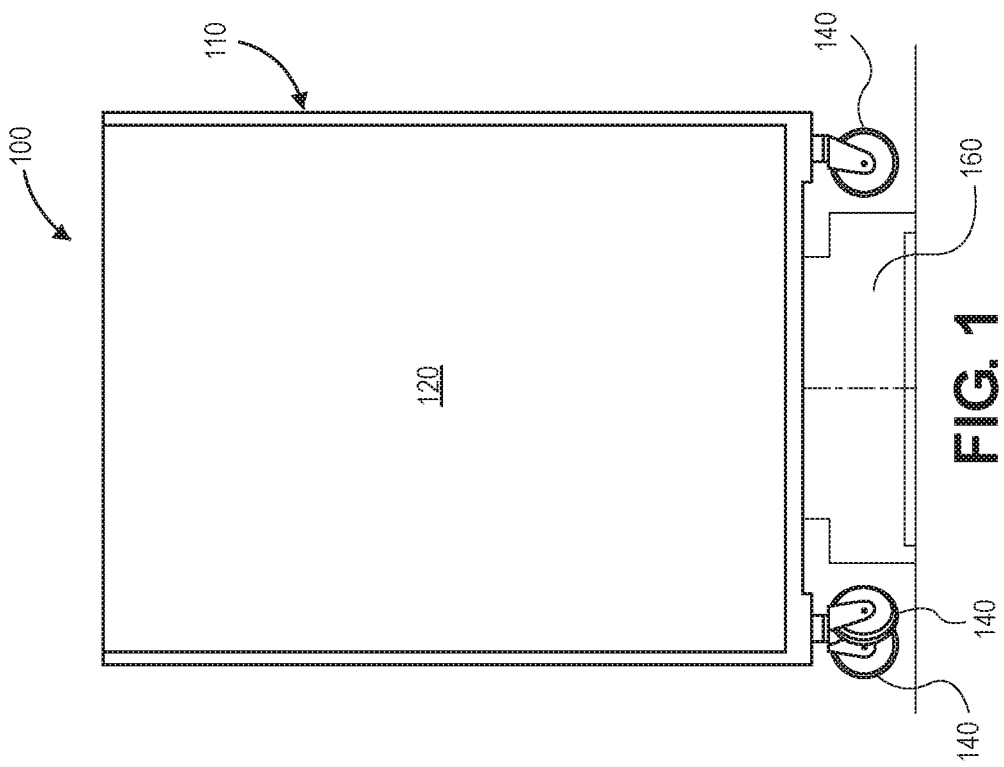

SELF-POSITIONING SWIVEL CASTER MECHANISMS

CROSS-REFERENCE TO RELATED APPLICATION

This application claims priority to U.S. Provisional Application No. 62/951,589, filed Dec. 20, 2019, the contents of which are herein incorporated by reference in their entirety.

BACKGROUND

Containers, carts, and other movable material handling equipment in material handling facilities may include one or more wheels, rollers, or casters to facilitate movement of such carts and equipment. Generally, one or more fixed casters on a cart may be positioned in a fixed orientation, and/or one or more swivel casters on a cart may freely rotate between various orientations. Although freely-rotating casters may facilitate turning and movement in various directions within material handling facilities, such freely-rotating casters may be positioned in substantially random positions when a cart is not being moved. Accordingly, there is a need for swivel casters that may be simply and reliably positioned in defined or known positions during various operations and processes within material handling facilities.

BRIEF DESCRIPTION OF THE DRAWINGS

FIG. 1 is a schematic, side view diagram of a mobile container on a drive unit with freely-rotating swivel casters in random positions, in accordance with implementations of the present disclosure.

FIG. 2 is a schematic, side view diagram of a mobile container on a drive unit with self-positioning swivel casters in home positions, in accordance with implementations of the present disclosure.

DETAILED DESCRIPTION

Figure 3:
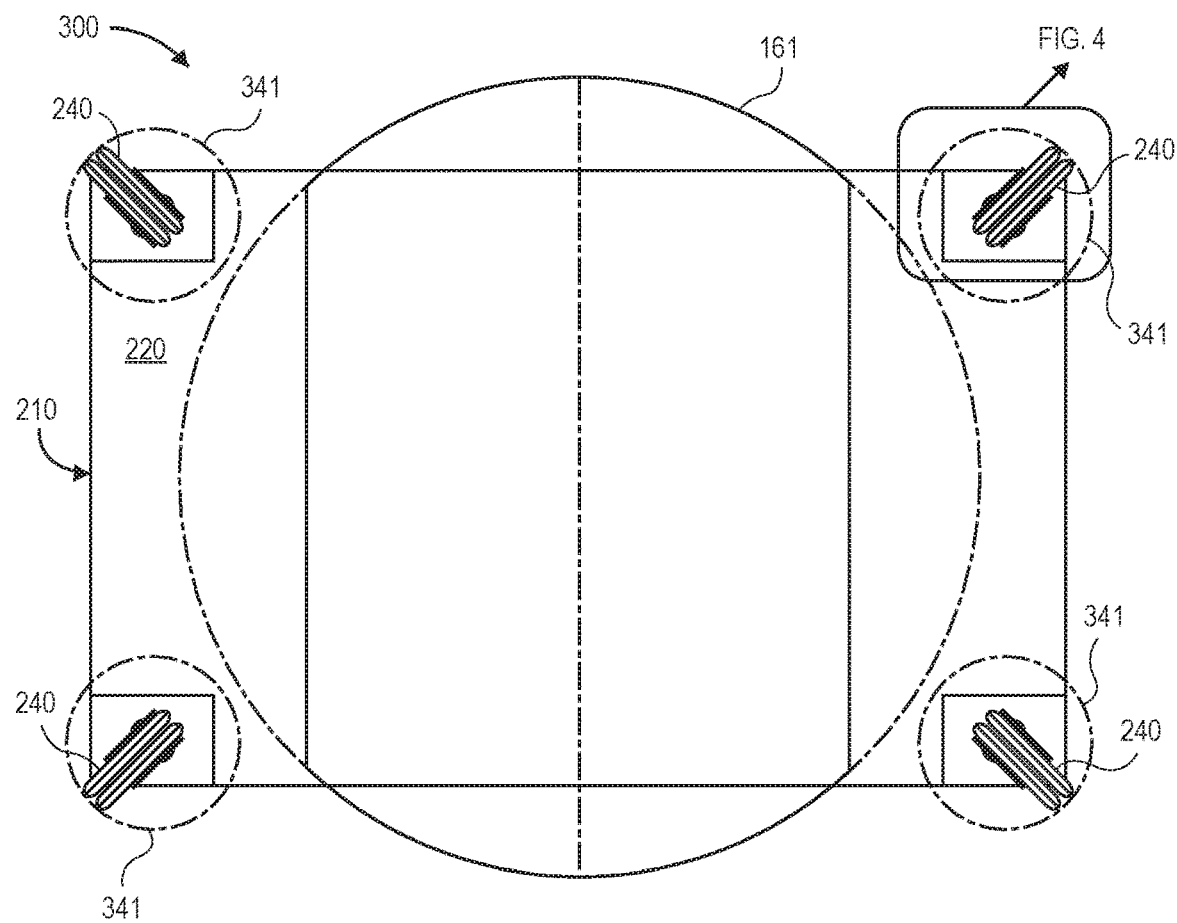
FIG. 3 is a schematic, bottom view diagram of a mobile container with self-positioning swivel casters in home positions, in accordance with implementations of the present disclosure.

As is set forth in greater detail below, implementations of the present disclosure are directed to self-positioning swivel caster systems and methods of using such self-positioning swivel casters. In example embodiments, self-positioning swivel casters may have associated home positions that may be defined positions or orientations of the swivel casters when lifted, stationary, and/or stopped.

For example, the home positions of self-positioning swivel casters associated with a container, cart, or other material handling equipment may increase or maximize space or clearance under the cart when the cart is stationary or stopped. In some example embodiments, robotic drive units or other types of material handling equipment, e.g., manual, automated, or robotic equipment, may be inserted or placed under the cart and between the self-positioning swivel casters, such that increasing or maximizing space or clearance under the cart and between the self-positioning swivel casters may facilitate reliable operations and prevent collisions or interferences between robotic drive units and portions of the cart. In other example embodiments, the home positions of self-positioning swivel casters associated with a container, cart, or other material handling equipment may be positioned substantially within an outer periphery, dimensions, or footprint associated with a receptacle of the cart when the cart is stationary or stopped, such that a plurality of carts may be positioned or stored adjacent to each other with minimal gap or clearance therebetween and without causing interference between respective swivel casters associated with adjacent carts.

In addition, the home positions of self-positioning swivel casters associated with a cart or other material handling equipment may enable a cart to substantially remain in position when lifted, stationary, or stopped. For example, a cart may be placed at a position on a substantially flat or horizontal floor or other surface of a material handling facility. However, due to irregularities, imperfections, protrusions, indentations, edges, slopes, angles, cracks, debris, or other surface characteristics associated with the surface, a cart that is stationary or stopped may move or drift, e.g., due to gravity. The home positions of self-positioning swivel casters may be selected or configured to prevent such movement or drift of a cart due to surface characteristics associated with a position at which the cart is placed. Further, maintaining a position of a cart that is placed within a material handling facility may also facilitate later retrieval and movement of the cart by robotic drive units or other types of material handling equipment because the cart may reliably remain at the placed position, such that collisions or interferences may be prevented between robotic drive units and portions of the cart during subsequent operations or processes.

In example embodiments, a self-positioning swivel caster may include a caster wheel, a swivel caster frame, a swivel caster bearing, and a lower cam, as well as an upper cam and a compression spring. The caster wheel may be rotatably coupled to the swivel caster frame. The swivel caster bearing may be coupled between the swivel caster frame and a portion of a cart, e.g., a rod, post, or shaft of the cart, to facilitate rotating or swiveling of the swivel caster frame and caster wheel relative to the portion of the cart, e.g., around an axis associated with the rod, post, or shaft of the cart. The lower cam may also be coupled to an upper portion of the swivel caster frame and rotate together with the swivel caster frame and caster wheel relative to the portion of the cart.

The upper cam may also be slidably coupled to a portion of the cart, e.g., a rod, post, or shaft of the cart, to facilitate sliding movement toward or away from the lower cam. Further, the compression spring may be positioned between the upper cam and a frame of the cart, e.g., a bottom surface or underside of the cart, and the compression spring may bias the upper cam toward the lower cam. Moreover, the lower cam and the upper cam may have matching or complementary surfaces, edges, or features that cooperate to cause the swivel caster frame and caster wheel to rotate or swivel to a defined home position, responsive to a force or torque exerted by the compression spring via the upper cam onto the lower cam.

In further example embodiments, a self-positioning swivel caster may be formed by retrofitting a fixed caster. For example, the retrofitted self-positioning swivel caster may include a fixed caster wheel, a swivel caster frame, a swivel caster bearing, and a lower cam, as well as a swivel shaft, an upper cam, and a compression spring. The fixed caster wheel may be rotatably coupled to the swivel caster frame. The swivel caster bearing may be coupled between the swivel caster frame and the swivel shaft to facilitate rotating or swiveling of the swivel caster frame and fixed caster wheel relative to the swivel shaft, e.g., around an axis associated with the swivel shaft. The lower cam may also be coupled to an upper portion of the swivel caster frame and rotate together with the swivel caster frame and fixed caster wheel relative to the swivel shaft.

In addition, the upper cam may also be slidably coupled to the swivel shaft to facilitate sliding movement toward or away from the lower cam. Further, the compression spring may be positioned between the upper cam and a base of the swivel shaft that is coupled to a frame of the cart, e.g., a bottom surface or underside of the cart, and the compression spring may bias the upper cam toward the lower cam. Moreover, the lower cam and the upper cam may have matching or complementary surfaces, edges, or features that cooperate to cause the swivel caster frame and fixed caster wheel to rotate or swivel to a defined home position, responsive to a force or torque exerted by the compression spring via the upper cam onto the lower cam.

FIG. 1 is a schematic, side view diagram 100 of a mobile container 110 on a drive unit with freely-rotating swivel casters in random positions, in accordance with implementations of the present disclosure.

As shown in FIG. 1, a mobile container or cart 110 may include a plurality of freely-rotating swivel casters 140 associated with a bottom surface of a receptacle 120. For example, a cart may include four freely-rotating swivel casters 140, with one positioned at each corner of the cart. In some examples, two of the four casters may have a swivel locking feature, such as a manually or foot-operated swivel locking feature, and the other two of the four casters may have a caster rotation locking feature, such as a manually or foot-operated caster rotation locking feature. The receptacle 120 of the cart may receive, carry, and transport various packages, boxes, items, products, or other objects of various types. In addition, the cart 110 may be configured to be lifted, carried, moved, and placed between positions within a material handling facility by robotic drive units 160 or other material handling equipment. In this manner, the cart 110 can be pushed by associates on surfaces, e.g., sort center floors, and the cart 110 can also be carried and transported by robotic drive units 160.

An example robotic drive unit 160 is shown in outline underneath the cart 110 in FIG. 1. Because the casters attached to the bottom of the cart are freely-rotating swivel casters 140, each of the casters may be oriented in various random positions when the cart is lifted, stationary, or stopped. Because of the random positions of the casters, a space or clearance between the casters through which the robotic drive unit 160 may need to pass to travel under, lift, carry, move, and place the cart may be variable. In some example embodiments, the random and variable positions of the casters, potentially in combination with movement or drift of the cart due to surface characteristics associated with the surface on which the cart is placed, may result in collisions or interferences between the robotic drive unit 160 and one or more casters 140 of the cart 110.

FIG. 2 is a schematic, side view diagram 200 of a mobile container 210 on a drive unit with self-positioning swivel casters in home positions, in accordance with implementations of the present disclosure.

As shown in FIG. 2, an example mobile container or cart 210 may include a plurality of self-positioning swivel casters 240, in contrast to the freely-rotating swivel casters 140 of FIG. 1, associated with a bottom surface of a receptacle 220. For example, a cart may include four self-positioning swivel casters 240, with one positioned at each corner of the cart. In addition, the self-positioning swivel casters 240 described herein may also include a manual swivel locking feature, such as a manually or foot-operated swivel locking feature, and/or a manual caster rotation locking feature, such as a manually or foot-operated caster rotation locking feature. The receptacle 220 of the cart may receive, carry, and transport various packages, boxes, items, products, or other objects of various types. In addition, the cart 210 may be configured to be lifted, carried, moved, and placed between positions within a material handling facility by robotic drive units 160 or other material handling equipment. In this manner, the cart 210 can be pushed by associates on surfaces, e.g., sort center floors, and the cart 210 can also be carried and transported by robotic drive units 160.

An example robotic drive unit 160 is shown in outline underneath the cart 210 in FIG. 2. Because the casters attached to the bottom of the cart are self-positioning swivel casters 240, each of the casters may be oriented in defined or known home positions when the cart is lifted, stationary, or stopped. Because of the defined home positions of the casters, a space or clearance between the casters through which the robotic drive unit 160 may need to pass to travel under, lift, carry, move, and place the cart may be substantially constant or known. In some example embodiments, the defined or constant home positions of the casters, potentially in combination with the minimization or elimination of movement or drift of the cart due to surface characteristics associated with the surface on which the cart is placed as a consequence of the configuration of the home positions of the casters, may prevent or minimize collisions or interferences between the robotic drive unit 160 and one or more casters 240 of the cart 210.

Figure 4:
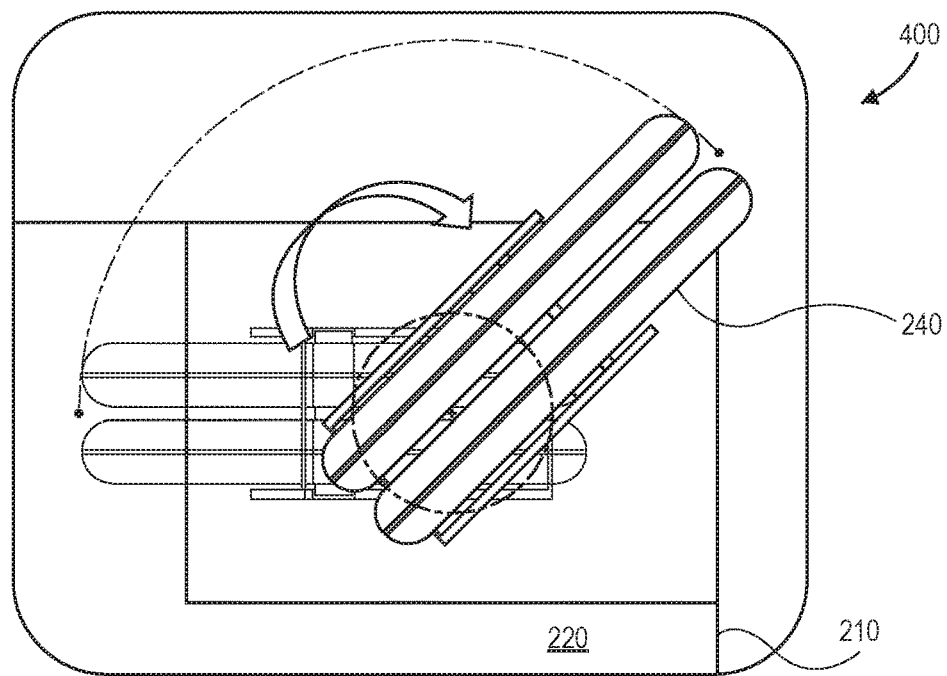
FIG. 4 is a schematic, bottom view diagram of a portion of a mobile container with a self-positioning swivel caster in a home position, in accordance with implementations of the present disclosure.

FIG. 3 is a schematic, bottom view diagram 300 of a mobile container 210 with self-positioning swivel casters in home positions, in accordance with implementations of the present disclosure, and FIG. 4 is a schematic, bottom view diagram 400 of a portion of a mobile container 210 with a self-positioning swivel caster in a home position, in accordance with implementations of the present disclosure.

As shown in FIGS. 2-4, in example embodiments, responsive to lifting a cart 210 by a robotic drive unit 160, the self-positioning swivel casters 240 may rotate or swivel to their respective home positions. The dash-dot circle 341 around each self-positioning swivel caster 240 in FIG. 3 indicates a swivel radius for the respective caster. Then, upon placing the cart 210 at a position by the robotic drive unit 160, the self-positioning swivel casters 240 may maintain their respective home positions, as shown in FIGS. 3 and 4. As set forth above, self-positioning swivel casters 240 having defined home positions may increase tunneling and rotation clearance for robotic drive units 160, e.g., space or clearance for robotic drive units 160 to move or travel under carts 210, as indicated by the substantially centered, vertical, dash-dot line and solid, vertical lines on either side thereof in FIG. 3, and/or space or clearance for robotic drive units 160 to rotate under carts 210, as indicated by the dash-dot circle 161 substantially centered on the bottom surface of the cart 210 in FIG. 3. Further, by increasing the tunneling and rotation clearance for robotic drive units 160, one or more dimensions or other characteristics of the cart 210 may be designed or configured as needed while still ensuring sufficient and substantially constant space or clearance as a result of the self-positioning swivel casters 240.

In some example embodiments, a cart 210 may include four self-positioning swivel casters 240. In other example embodiments, a cart 210 may include two self-positioning swivel casters 240 and two fixed casters, e.g., casters that are oriented in a fixed direction and do not swivel. In further example embodiments, a cart 210 may include two, three, or other numbers of self-positioning swivel casters 240, potentially in combination with various numbers of fixed casters and/or freely-rotating swivel casters.

As shown in the example embodiments of FIGS. 2-4, the defined home positions of the four self-positioning swivel casters 240 may each point substantially away from a center of the cart 210 and may be approximately 90 degrees rotated with respect to adjacent casters, and/or angled relative to each other. In other examples, the defined home positions of the four self-positioning swivel casters 240 may each point substantially away from a center of the cart 210, and two casters, e.g., two casters on the right side of FIG. 3, may be rotated approximately 75-105 degrees, approximately 60-120 degrees, approximately 45-135 degrees, or approximately 30-150 degrees with respect to each other, and the other two casters, e.g., two casters on the left side of FIG. 3, may be rotated approximately 75-105 degrees, approximately 60-120 degrees, approximately 45-135 degrees, or approximately 30-150 degrees with respect to each other. In further examples, the defined home positions of the four self-positioning swivel casters 240 may each be rotated approximately 90 degrees in a clockwise direction from that shown in FIG. 3, with each caster still being rotated approximately 90 degrees with respect to adjacent casters.

Figure 5:
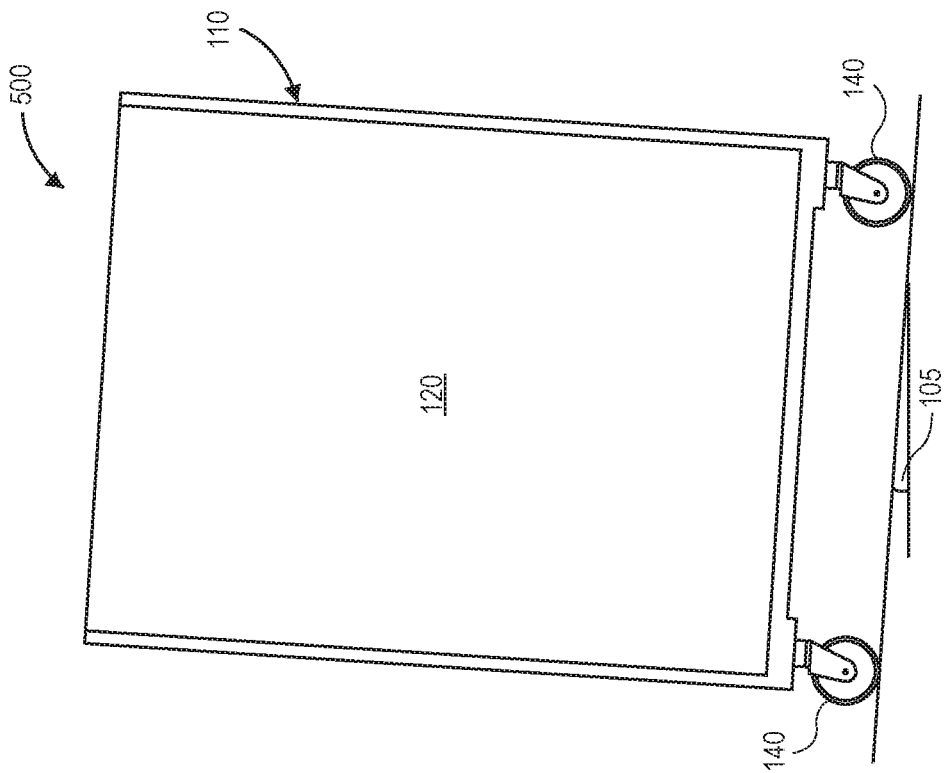
FIG. 5 is a schematic, side view diagram of a mobile container with freely-rotating swivel casters in aligned positions that allow drift along a slope of a floor, in accordance with implementations of the present disclosure.

FIG. 5 is a schematic, side view diagram 500 of a mobile container 110 with freely-rotating swivel casters in aligned positions that allow drift along a slope of a floor, in accordance with implementations of the present disclosure.

Similar to the example shown in FIG. 1, a mobile container or cart 110 as shown in FIG. 5 may include a plurality of freely-rotating swivel casters 140. For example, a cart 110 may include four freely-rotating swivel casters 140, with one positioned at each corner of the cart. In some examples, two of the four casters may have a swivel locking feature, such as a manually or foot-operated swivel locking feature, and the other two of the four casters may have a caster rotation locking feature, such as a manually or foot-operated caster rotation locking feature. The receptacle 120 of the cart may receive, carry, and transport various packages, boxes, items, products, or other objects of various types. In addition, the cart 110 may be configured to be lifted, carried, moved, and placed between positions within a material handling facility by robotic drive units 160 or other material handling equipment. In this manner, the cart 110 can be pushed by associates on surfaces, e.g., sort center floors, and the cart 110 can also be carried and transported by robotic drive units 160.

Due to various surface characteristics associated with a surface or floor on which a cart is placed, e.g., irregularities, imperfections, protrusions, indentations, edges, slopes, angles, cracks, debris, or other surface characteristics, a cart may tend to move or drift from a position at which the cart was initially placed, e.g., due to gravity. As shown in FIG. 5, because the casters attached to the bottom of the cart 110 are freely-rotating swivel casters 140, a slope 105 of the floor may cause the freely-rotating swivel casters 140 to rotate and align with a direction of slope 105 of the floor, thereby permitting or enabling movement or drift of the cart 110 from the position at which the cart was placed. Such movement or drift of the cart 110 may prevent later retrieval of the cart by a robotic drive unit 160, and may cause collisions or interferences between a robotic drive unit 160 and portions of the cart 110 during such subsequent operations or processes.

Figure 6:
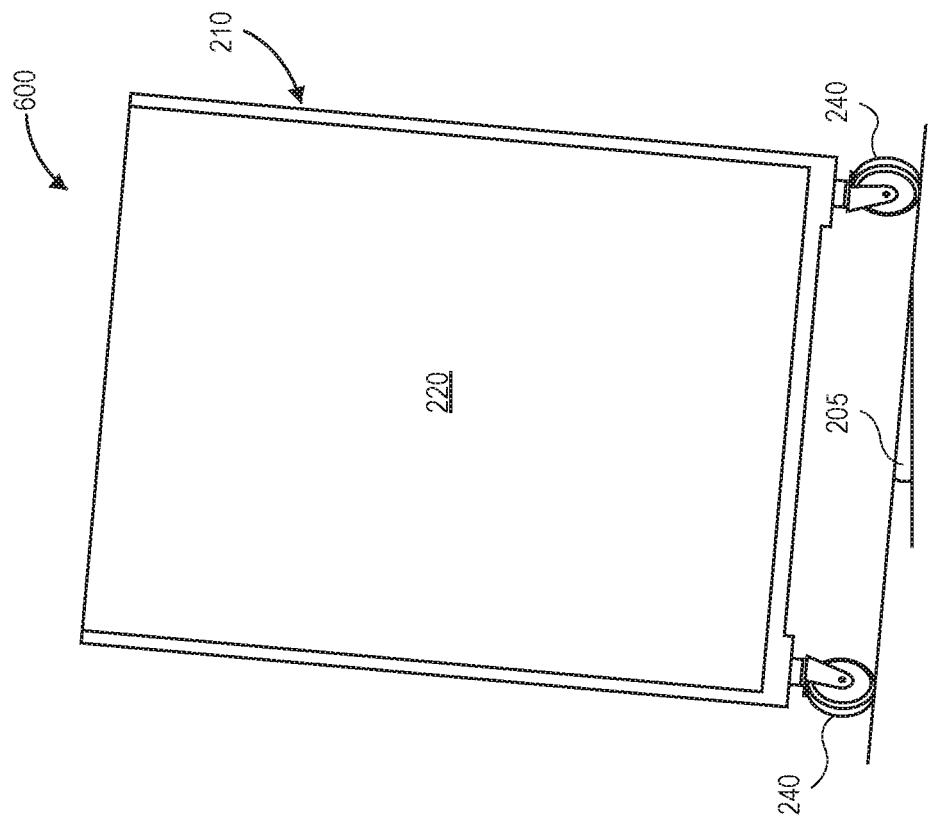
FIG. 6 is a schematic, side view diagram of a mobile container with self-positioning swivel casters in home positions that prevent drift along a slope of a floor, in accordance with implementations of the present disclosure.

FIG. 6 is a schematic, side view diagram 600 of a mobile container 210 with self-positioning swivel casters in home positions that prevent drift along a slope of a floor, in accordance with implementations of the present disclosure.

Similar to the examples shown in FIGS. 2-4, an example mobile container or cart 210 as shown in FIG. 6 may include a plurality of self-positioning swivel casters 240, in contrast to the freely-rotating swivel casters 140 of FIGS. 1 and 5. For example, a cart 210 may include four self-positioning swivel casters 240, with one positioned at each corner of the cart. In addition, the self-positioning swivel casters 240 described herein may also include a manual swivel locking feature, such as a manually or foot-operated swivel locking feature, and/or a manual caster rotation locking feature, such as a manually or foot-operated caster rotation locking feature. The receptacle 220 of the cart may receive, carry, and transport various packages, boxes, items, products, or other objects of various types. In addition, the cart 210 may be configured to be lifted, carried, moved, and placed between positions within a material handling facility by robotic drive units 160 or other material handling equipment. In this manner, the cart 210 can be pushed by associates on surfaces, e.g., sort center floors, and the cart 210 can also be carried and transported by robotic drive units 160.

Due to various surface characteristics associated with a surface or floor on which a cart is placed, e.g., irregularities, imperfections, protrusions, indentations, edges, slopes, angles, cracks, debris, or other surface characteristics, a cart may tend to move or drift from a position at which the cart was initially placed, e.g., due to gravity. As shown in FIG. 6, because the casters attached to the bottom of the cart 210 are self-positioning swivel casters 240, a slope 205 of the floor may not cause the self-positioning swivel casters 240 to rotate and align with a direction of slope 205 of the floor, thereby preventing or minimizing movement or drift of the cart 210 from the position at which the cart was placed. By maintaining a position of the cart 210 and preventing movement or drift, later retrieval of the cart 210 by a robotic drive unit 160 may be reliably enabled, and collisions or interferences between a robotic drive unit 160 and portions of the cart 210 may be prevented or minimized during such subsequent operations or processes.

In example embodiments, the self-positioning swivel casters 240 described herein may maintain their respective home positions relative to a slope 205 of the floor or surface of up to approximately 1, 2, or 3 degrees of slope relative to horizontal, up to approximately 5 degrees of slope relative to horizontal, and/or up to approximately other degrees of slope relative to horizontal. The slope 205 of the floor or surface relative to the horizontal may correspond to a component of a force of gravity acting on the cart that may tend to cause the swivel casters to rotate away from their respective home positions. Generally, the force or torque at which a self-positioning swivel caster may begin to rotate away from a respective home position may be referred to as caster snap resistance. In addition, the caster snap resistance may be defined by the particular design and configuration of the self-positioning swivel mechanism of the self-positioning swivel caster, as further described herein. As a result, the force or torque needed to overcome the caster snap resistance may act as a brake to prevent movement, rolling, or drift of the cart. Moreover, the caster snap resistance associated with the self-positioning swivel mechanism of the self-positioning caster may be a relatively small or minimal force or torque, such that a cart having two or more self-positioning swivel casters may be moved or pushed by a human associate with only a small or negligible increase in force as compared to a force required to move or push a cart having freely-rotating casters.

In other example embodiments, a cart 210 may include at least two self-positioning swivel casters 240, in combination with one or more fixed casters and/or freely-rotating swivel casters. For example, the at least two self-positioning swivel casters 240 may be approximately orthogonal, e.g., rotated 90 degrees, or otherwise angled with respect to each other. In other examples, the at least two self-positioning swivel casters 240 may be rotated approximately 75-105 degrees, approximately 60-120 degrees, approximately 45-135 degrees, or approximately 30-150 degrees with respect to each other. In such example embodiments, the at least two self-positioning swivel casters 240 may be sufficient to maintain a position of a cart 210 that is placed on a surface or floor having various surface characteristics, such as a slope 205 of the floor or surface of up to approximately 1, 2, or 3 degrees of slope relative to horizontal, up to approximately 5 degrees of slope relative to horizontal, and/or up to approximately other degrees of slope relative to horizontal.

The strategically chosen, designed, or configured home positions of at least two self-positioning swivel casters 240 of a cart 210 can act as a "lock" to prevent the cart from moving, rolling, or drifting on uneven or slanted floors, which may include expected variations of floor levelness and flatness in accordance with floor specifications of a material handling facility. Thus, for a cart 210 including at least two self-positioning swivel casters 240, the respective home positions may be chosen, designed, or configured such that at least one self-positioning swivel caster 240 is not aligned with a slope 205 of the floor, thereby preventing movement, rolling, or drift of the cart to enable reliable placement and retrieval of the cart 210 by a robotic drive unit 160, while also preventing or minimizing collisions or interferences between the robotic drive unit 160 and portions of the cart 210. Further, for a cart 210 including at least four self-positioning swivel casters 240, the respective home positions may be chosen, designed, or configured such that at least two self-positioning swivel casters 240 are not aligned with a slope 205 of the floor, thereby preventing movement, rolling, or drift of the cart to enable reliable placement and retrieval of the cart 210 by a robotic drive unit 160, while also preventing or minimizing collisions or interferences between the robotic drive unit 160 and portions of the cart 210.

Figure 7A:
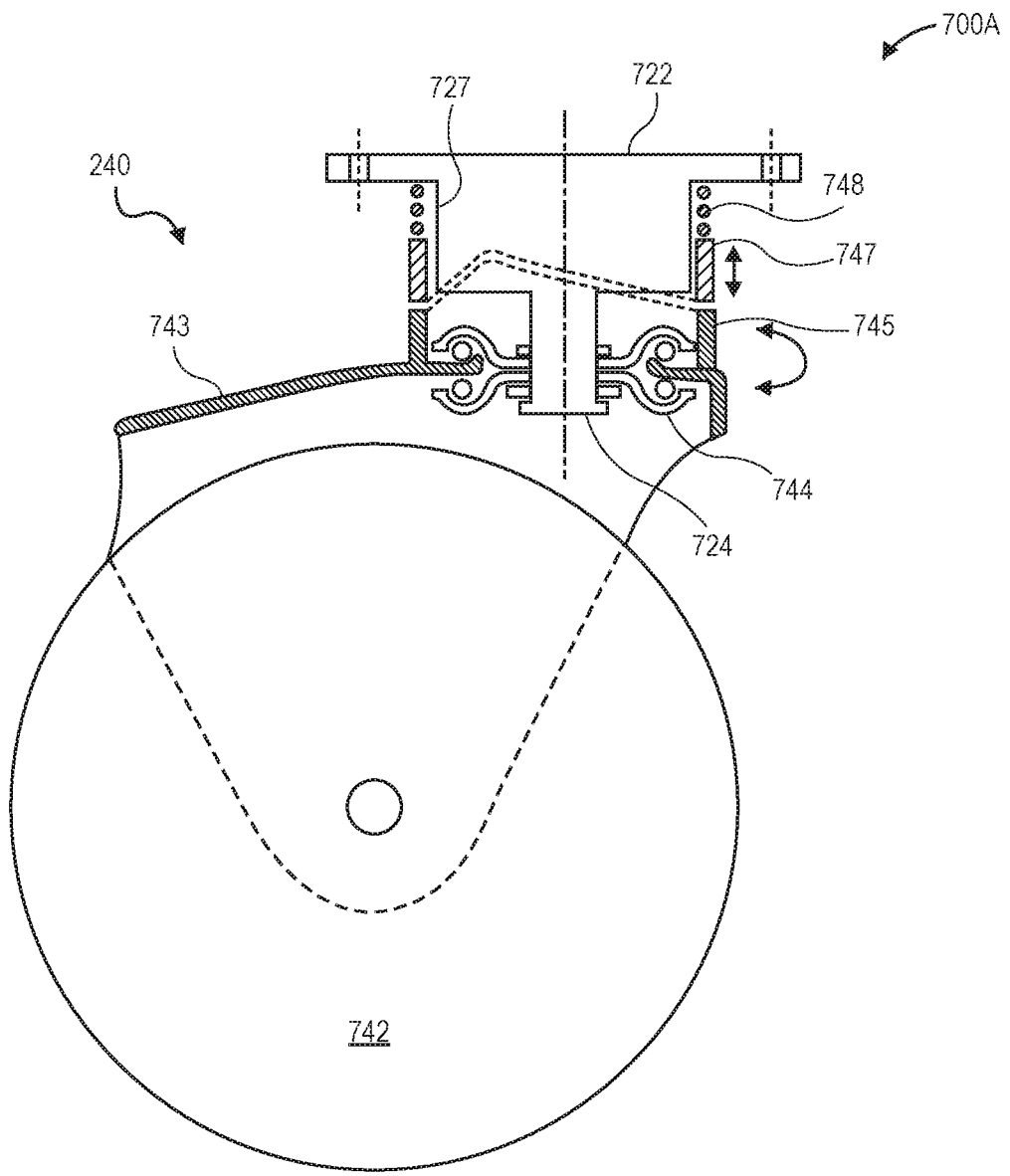
FIG. 7A is a schematic, partial cross-sectional view diagram of a self-positioning swivel caster mechanism, in accordance with implementations of the present disclosure.
Figure 7B:
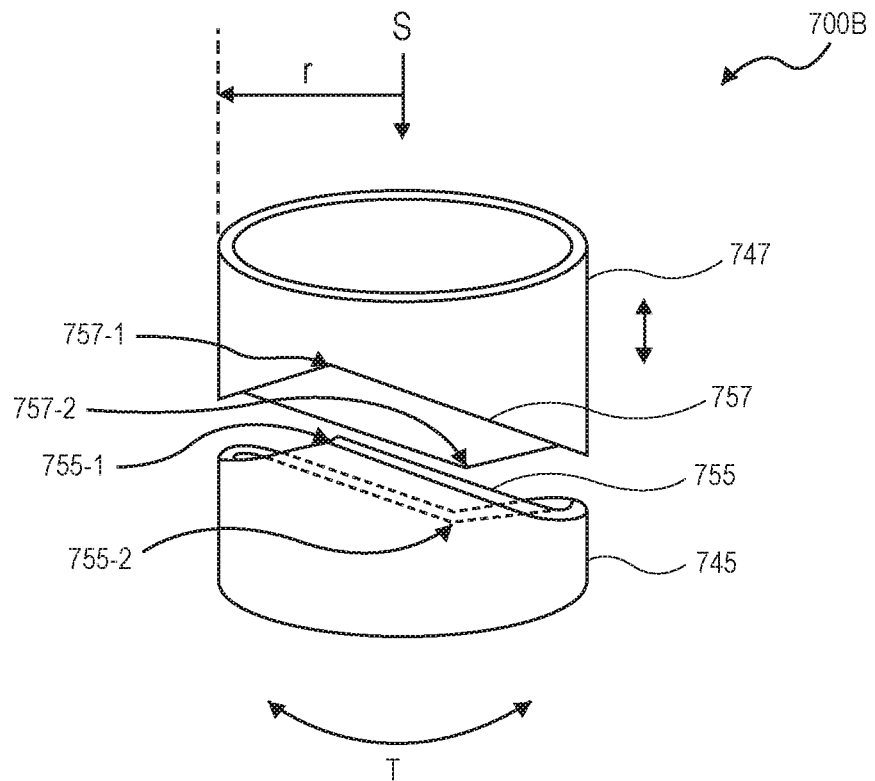
FIG. 7B is a schematic, perspective view diagram of a portion of a self-positioning swivel caster mechanism, in accordance with implementations of the present disclosure.
Figure 7C:
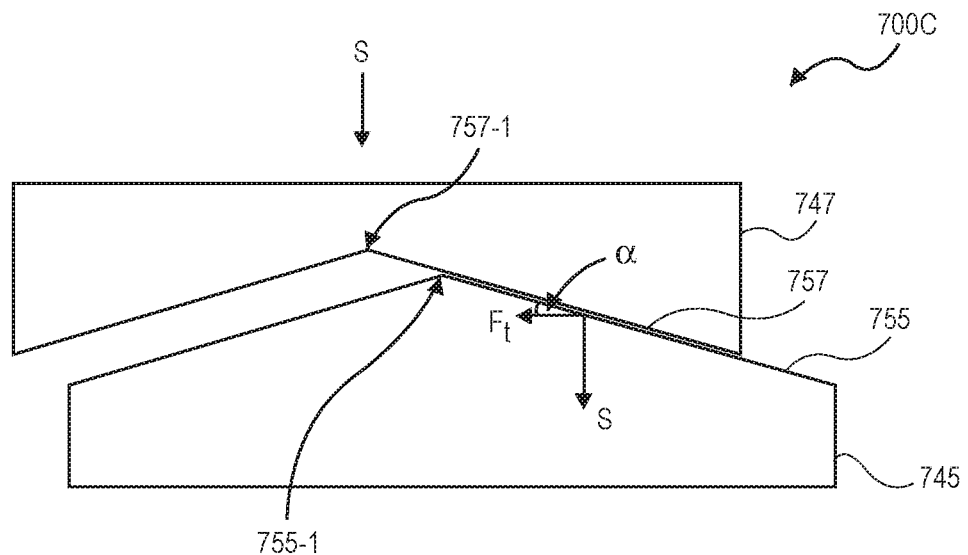
FIG. 7C is a schematic, side view diagram of a portion of a self-positioning swivel caster mechanism, in accordance with implementations of the present disclosure.

FIG. 7A is a schematic, partial cross-sectional view diagram 700A of a self-positioning swivel caster mechanism, in accordance with implementations of the present disclosure. FIG. 7B is a schematic, perspective view diagram 700B of a portion of a self-positioning swivel caster mechanism, in accordance with implementations of the present disclosure. FIG. 7C is a schematic, side view diagram 700C of a portion of a self-positioning swivel caster mechanism, in accordance with implementations of the present disclosure. In FIG. 7C, the portion of the self-positioning swivel caster mechanism, e.g., the circular lower and upper cams, may be illustrated as substantially cut, unwound or opened, and laid out on a flat surface.

As shown in FIGS. 7A-7C, a self-positioning swivel caster 240 may include a caster wheel 742, a swivel caster frame 743, a swivel caster bearing 744, and a lower cam 745, as well as an upper cam 747 and a compression spring 748. Various components of a self-positioning swivel caster 240 may be formed of metals, plastics, composites, or combinations thereof. The caster wheel 742 may be rotatably coupled to the swivel caster frame 743. The swivel caster bearing 744 may be coupled between the swivel caster frame 743 and a portion 722 of a cart, e.g., a first rod, post, or shaft 724 of the cart, to facilitate rotating or swiveling of the swivel caster frame 743 and caster wheel 742 relative to the portion 722 of the cart, e.g., around an axis associated with the first rod, post, or shaft 724 of the cart. The lower cam 745 may also be coupled to or integrally formed with an upper portion of the swivel caster frame 743 and rotate together with the swivel caster frame 743 and caster wheel 742 relative to the portion 722 of the cart. In addition, an axis of rotation of the caster wheel 742 may be substantially perpendicular to and offset from the axis associated with the first rod, post, or shaft 724 of the portion 722 of the cart.

The upper cam 747 may also be slidably coupled to a portion 722 of the cart, e.g., a second rod, post, or shaft 727 of the cart, to facilitate sliding movement toward or away from the lower cam 745. For example, the upper cam 747 may be keyed, splined, or otherwise coupled to the second rod, post, or shaft 727 of the cart such that the upper cam 747 may move vertically toward or away from the lower cam 745, but the upper cam 747 may not rotate relative to the portion 722 of the cart, e.g., around an axis associated with the second rod, post, or shaft 727 of the cart. Further, the compression spring 748 may be positioned between the upper cam 747 and a frame or portion 722 of the cart, e.g., a bottom surface or underside of the cart or a bracket coupled to the underside of the cart, and the compression spring 748 may bias the upper cam 747 toward the lower cam 745. In addition, an axis of rotation of the caster wheel 742 may be substantially perpendicular to and offset from the axis associated with the second rod, post, or shaft 727 of the portion 722 of the cart.

Figure 8:
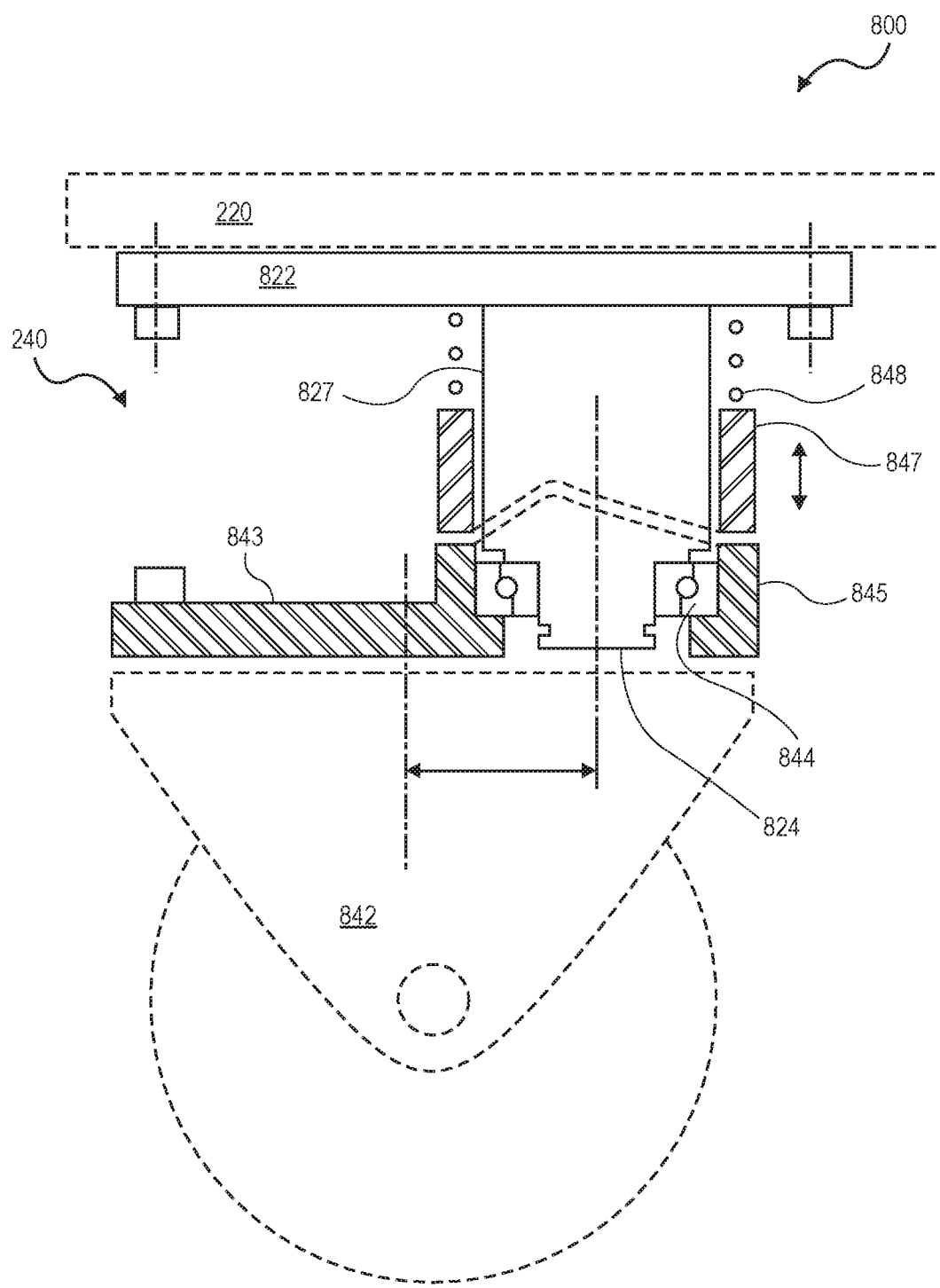
FIG. 8 is a schematic, partial cross-sectional view diagram of a self-positioning swivel caster mechanism to retrofit a fixed caster, in accordance with implementations of the present disclosure.

FIG. 8 is a schematic, partial cross-sectional view diagram 800 of a self-positioning swivel caster mechanism to retrofit a fixed caster, in accordance with implementations of the present disclosure.

As shown in FIG. 8, a self-positioning swivel caster 240 may be formed by retrofitting a fixed caster 842. For example, the retrofitted self-positioning swivel caster may include a fixed caster wheel 842, a swivel caster frame 843, a swivel caster bearing 844, and a lower cam 845, as well as a swivel shaft bracket 822, an upper cam 847, and a compression spring 848. Various components of a self-positioning swivel caster 240 may be formed of metals, plastics, composites, or combinations thereof. The fixed caster wheel 842 may be rotatably coupled to the swivel caster frame 843. The swivel caster bearing 844 may be coupled between the swivel caster frame 843 and a first shaft 824 of the swivel shaft bracket 822 to facilitate rotating or swiveling of the swivel caster frame 843 and fixed caster wheel 842 relative to the swivel shaft bracket 822, e.g., around an axis associated with the first shaft 824 of the swivel shaft bracket 822. The lower cam 845 may also be coupled to or integrally formed with an upper portion of the swivel caster frame 843 and rotate together with the swivel caster frame 843 and fixed caster wheel 842 relative to the swivel shaft bracket 822. In addition, an axis of rotation of the fixed caster wheel 842 may be substantially perpendicular to and offset from the axis associated with the first shaft 824 of the swivel shaft bracket 822.

In addition, the upper cam 847 may also be slidably coupled to the swivel shaft bracket 822 to facilitate sliding movement toward or away from the lower cam 845. For example, the upper cam 847 may be keyed, splined, or otherwise coupled to a second shaft 827 of the swivel shaft bracket 822 such that the upper cam 847 may move vertically toward or away from the lower cam 845, but the upper cam 847 may not rotate relative to the swivel shaft bracket 822, e.g., around an axis associated with the second shaft 827 of the swivel shaft bracket 822. Further, the compression spring 848 may be positioned between the upper cam 847 and a base of the swivel shaft bracket 822 that is coupled to a frame of the cart, e.g., a bottom surface or underside of the cart, and the compression spring 848 may bias the upper cam 847 toward the lower cam 845. In addition, an axis of rotation of the fixed caster wheel 842 may be substantially perpendicular to and offset from the axis associated with the second shaft 827 of the swivel shaft bracket 822.

As shown in further detail in FIGS. 7B and 7C, and with respect to the self-positioning swivel casters 240 as shown and described in FIGS. 7A-7C and FIG. 8, the lower cam 745 and the upper cam 747 may have matching, mating, or complementary surfaces, edges, or features 755, 757 that cooperate to cause the swivel caster frame and caster wheel to rotate or swivel to a defined home position, responsive to a force or torque exerted by the compression spring via the upper cam onto the lower cam. For example, the lower cam 745 may include a peak at a first point or portion 755-1 along the circumference of the lower cam 745, each side of the peak may have a respective slope or angle vertically downward away from the peak along respective circumferential sides of the lower cam 745, and the respective slopes or angles along respective circumferential sides of the lower cam 745 may meet at a valley at a second point or portion 755-2 along the circumference of the lower cam 745. In one example, the first point or portion 755-1 and the second point or portion 755-2 may be on opposite sides of the lower cam 745, e.g., approximately 180 degrees around the circumference of the lower cam 745 from each other. In other examples, the first point or portion 755-1 and the second point or portion 755-2 may be at other positions relative to each other around the circumference of the lower cam 745. In addition, the respective slopes or angles may be a same slope or angle, or different respective slopes or angles, along respective circumferential sides of the lower cam 745. Further, the respective slopes or angles may be constant slopes or angles between the first and second points or portions 755-1, 755-2, or variable slopes or angles between the first and second points or portions 755-1, 755-2.

Likewise, the upper cam 747 may also include a peak at a first point or portion 757-1 along the circumference of the upper cam 747, each side of the peak may have a respective slope or angle vertically downward away from the peak along respective circumferential sides of the upper cam 747, and the respective slopes or angles along respective circumferential sides of the upper cam 747 may meet at a valley at a second point or portion 757-2 along the circumference of the upper cam 747. In one example, the first point or portion 757-1 and the second point or portion 757-2 may be on opposite sides of the upper cam 747, e.g., approximately 180 degrees around the circumference of the upper cam 747 from each other. In other examples, the first point or portion 757-1 and the second point or portion 757-2 may be at other positions relative to each other around the circumference of the upper cam 747. In addition, the respective slopes or angles may be a same slope or angle, or different respective slopes or angles, along respective circumferential sides of the upper cam 747. Further, the respective slopes or angles may be constant slopes or angles between the first and second points or portions 757-1, 757-2, or variable slopes or angles between the first and second points or portions 757-1, 757-2.

At a home position of a self-positioning swivel mechanism of a self-positioning swivel caster 240 as described herein, a peak 755-1 of the lower cam 745 may align with a peak 757-1 of the upper cam 747, and a valley 755-2 of the lower cam 745 may align with a valley 757-2 of the upper cam 747. The chosen, designed, or configured slopes or angles of the respective circumferential sides of the lower cam 745 and the upper cam 747 may affect or select, at least in part, a caster snap resistance associated with the self-positioning swivel mechanism of the self-positioning swivel caster 240 that prevents movement, rolling, or drift of a cart responsive to variations in surface characteristics of a surface or floor on which the cart is placed. In addition, a spring force associated with the compression spring that biases the upper cam 747 toward the lower cam 745, as well as coefficients of friction associated with materials of the upper cam 747 and lower cam 745, may also affect or select, at least in part, the caster snap resistance associated with the self-positioning swivel mechanism of the self-positioning swivel caster 240.

In example embodiments, an effective force acting to rotate or swivel the self-positioning swivel caster 240 toward a home position may be based on a theoretical portion or component of force applied by the compression spring, labeled "S" in FIGS. 7B and 7C, through the upper cam 747 to the lower cam 745, less a frictional force between the mating surfaces of the upper cam 747 and the lower cam 745 due to the force applied by the compression spring, and/or less other frictional forces, such as frictional forces associated with rotation of the swivel caster bearing 744. In addition, the theoretical portion or component of force, labeled "$F_t$" in FIG. 7C, applied by the compression spring through the upper cam 747 to the lower cam 745 may be based on the slope or angle relative to horizontal, labeled "a" in FIG. 7C, of the mating surfaces between the upper cam 747 and lower cam 745. Furthermore, the effective torque, labeled "T" in FIG. 7B, acting to rotate or swivel the self-positioning swivel caster 240 toward a home position may be based on the effective force, as described herein, multiplied by the radius, labeled "r" in FIG. 7B, associated with the mating surfaces of the upper and lower cams.

Accordingly, the effective torque may be the torque applied by the compression spring 748 via the upper cam 747 to the lower cam 745 to rotate or swivel the lower cam 745, swivel caster frame 743, and caster wheel 742 toward the home position. Further, the effective torque may also generally correspond to the caster snap resistance that acts as a brake to prevent movement, rolling, or drift of a cart 210 having a self-positioning swivel caster 240. Moreover, the caster snap resistance associated with the self-positioning swivel mechanism of the self-positioning caster 240 may be a relatively small or minimal force or torque, such that a cart 210 having two or more self-positioning swivel casters 240 may be moved or pushed by a human associate with only a small or negligible increase in force as compared to a force required to move or push a cart 110 having freely-rotating casters 140.

Although the example embodiments described herein include a compression spring that applies a force via the upper cam to the lower cam of the self-positioning swivel mechanisms, in other example embodiments, various types of springs such as tension springs, torsion springs, or other types of springs may be used to similarly apply a force via the upper cam to the lower cam. In further example embodiments, various other resilient, flexible, bias, or elastic elements or components that can apply a bias force via the upper cam to the lower cam may also be used in place of or in combination with a compression spring or other types of springs.

Figure 9:
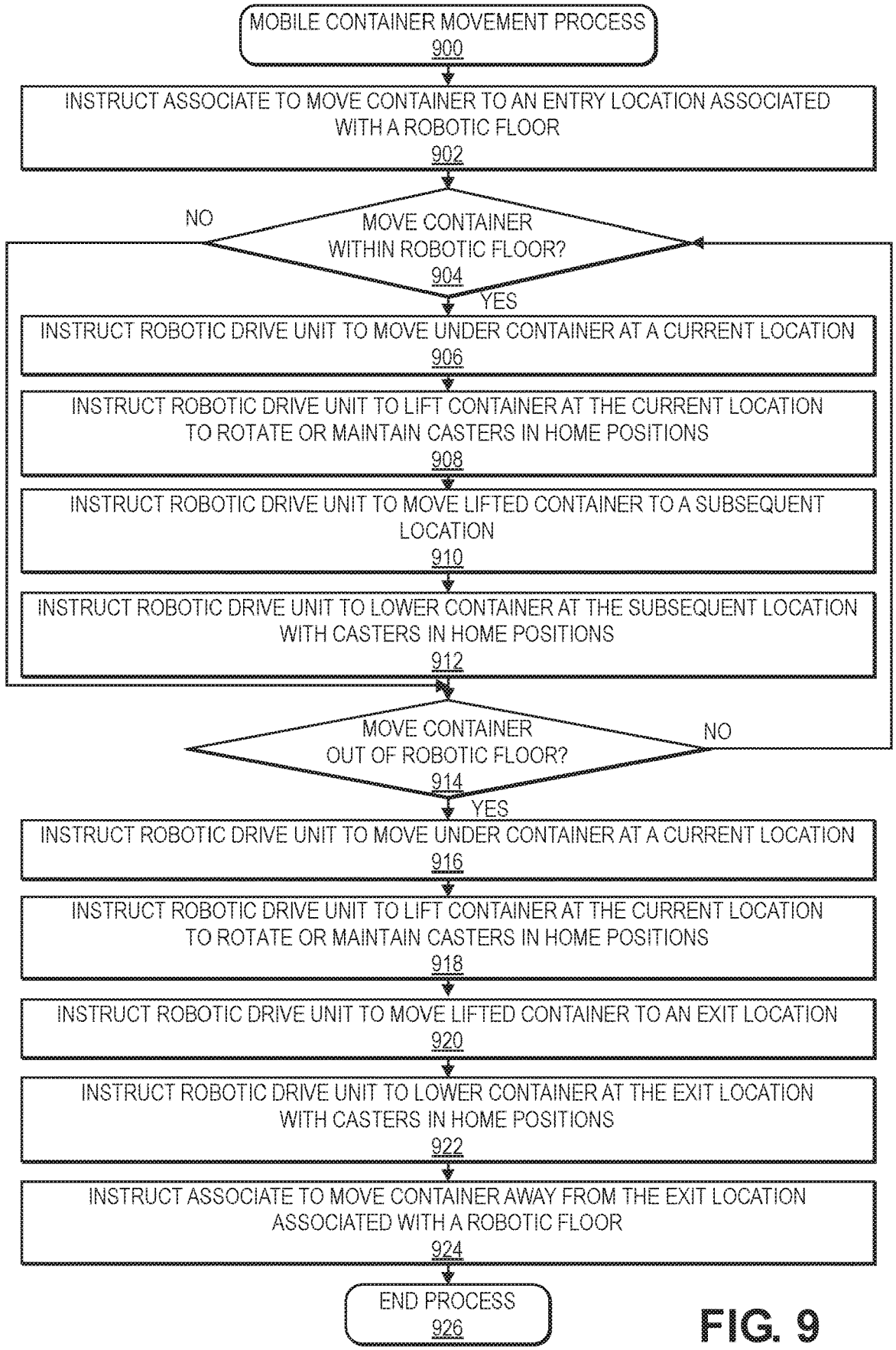
FIG. 9 is a flow diagram illustrating an example mobile container movement process, in accordance with implementations of the present disclosure.

FIG. 9 is a flow diagram 900 illustrating an example mobile container movement process, in accordance with implementations of the present disclosure.

In example operations or processes using a cart or container having self-positioning swivel casters, one or more packages, boxes, or other objects may be loaded into a receptacle of the cart. The cart may then be moved, e.g., by a human associate and/or responsive to instructions from a controller, to an edge or entry location associated with a robotic storage and/or sortation floor or area, as at 902. Responsive to movement or rolling of the cart by a human associate to an entry location associated with the robotic floor, the self-positioning swivel casters of the cart may not be aligned in their respective home positions, and may instead be aligned in various positions based on the movement and rolling by the human associate.

Then, it may be determined whether the container is to be moved within the robotic floor, as at 904. If the container is to be moved within the robotic floor, a robotic drive unit may be instructed, e.g., by a controller, to move or drive under the cart between the casters of the cart and lift the cart, as at 906 and 908. Upon lifting the cart, the self-positioning swivel casters of the cart may rotate or swivel to their respective home positions based on the self-positioning swivel mechanisms of the self-positioning swivel casters. Then, the robotic drive unit may be instructed, e.g., by a controller, to move or transport the lifted cart to another location within the robotic floor, e.g., a storage location, as at 910, and the robotic drive unit may be instructed, e.g., by a controller, to lower or place the cart down at the storage location, as at 912. Responsive to transport and placement of the cart by the robotic drive unit at the storage location associated with the robotic floor, the self-positioning swivel casters of the cart may remain aligned in their respective home positions, and may thereby maintain space or clearance for movement or rotation of robotic drive units under the cart, as well as prevent or minimize movement or drift of the cart relative to the storage location.

During subsequent example operations or processes using a cart or container having self-positioning swivel casters within a robotic floor, it may be determined again whether the container is to be moved within the robotic floor, as at 904. If the container is to be moved again within the robotic floor, a robotic drive unit may be instructed, e.g., by a controller, to move or drive under the cart at the storage location between the casters of the cart and lift the cart, as at 906 and 908. Upon lifting the cart, the self-positioning swivel casters of the cart may remain aligned in their respective home positions based on the self-positioning swivel mechanisms of the self-positioning swivel casters. Then, the robotic drive unit may be instructed, e.g., by a controller, to move or transport the lifted cart to another location within the robotic floor, e.g., a sortation, packing, shipping, or other location, as at 910, and the robotic drive unit may be instructed, e.g., by a controller, to lower or place the cart down at the other location, as at 912. Responsive to transport and placement of the cart by the robotic drive unit at the other location associated with the robotic floor, the self-positioning swivel casters of the cart may remain aligned in their respective home positions, and may thereby maintain space or clearance for movement or rotation of robotic drive units under the cart, as well as prevent or minimize movement or drift of the cart relative to the other location.

During further example operations or processes using a cart or container having self-positioning swivel casters within a robotic floor, it may be determined whether the container is to be moved out of the robotic floor, as at 914. If the container is to be moved out of the robotic floor, a robotic drive unit may be instructed, e.g., by a controller, to move or drive under the cart at a storage or other location between the casters of the cart and lift the cart, as at 916 and 918. Upon lifting the cart, the self-positioning swivel casters of the cart may remain aligned in their respective home positions based on the self-positioning swivel mechanisms of the self-positioning swivel casters. Then, the robotic drive unit may be instructed, e.g., by a controller, to move or transport the lifted cart to another location within the robotic floor, e.g., an edge or exit location associated with the robotic floor, as at 920, and the robotic drive unit may be instructed, e.g., by a controller, to lower or place the cart down at the exit location, as at 922. Responsive to transport and placement of the cart by the robotic drive unit at the exit location associated with the robotic floor, the self-positioning swivel casters of the cart may remain aligned in their respective home positions, and may thereby maintain space or clearance for movement or rotation of robotic drive units under the cart, as well as prevent or minimize movement or drift of the cart relative to the exit location. Thereafter, the cart may then be moved, e.g., by a human associate and/or responsive to instructions from a controller, away from the edge or exit location associated with the robotic floor, as at 924. Responsive to movement or rolling of the cart by a human associate away from the exit location associated with the robotic floor, the self-positioning swivel casters of the cart may not be aligned in their respective home positions, and may instead be aligned in various positions based on the movement and rolling by the human associate. The process may then end, as at 926.

Various other combinations of operations and processes may be performed using carts or containers having self-positioning swivel casters, in which various operations or processes may be performed by human associates, robotic drive units, other material handling equipment, and/or combinations thereof. Further, various operations or processes described herein may be controlled, commanded, or instructed by one or more control systems, controllers, processors, or other computing systems or devices, including material handling system equipment, control systems, controllers, or computers, or other types of computing systems or devices.

Figure 10:
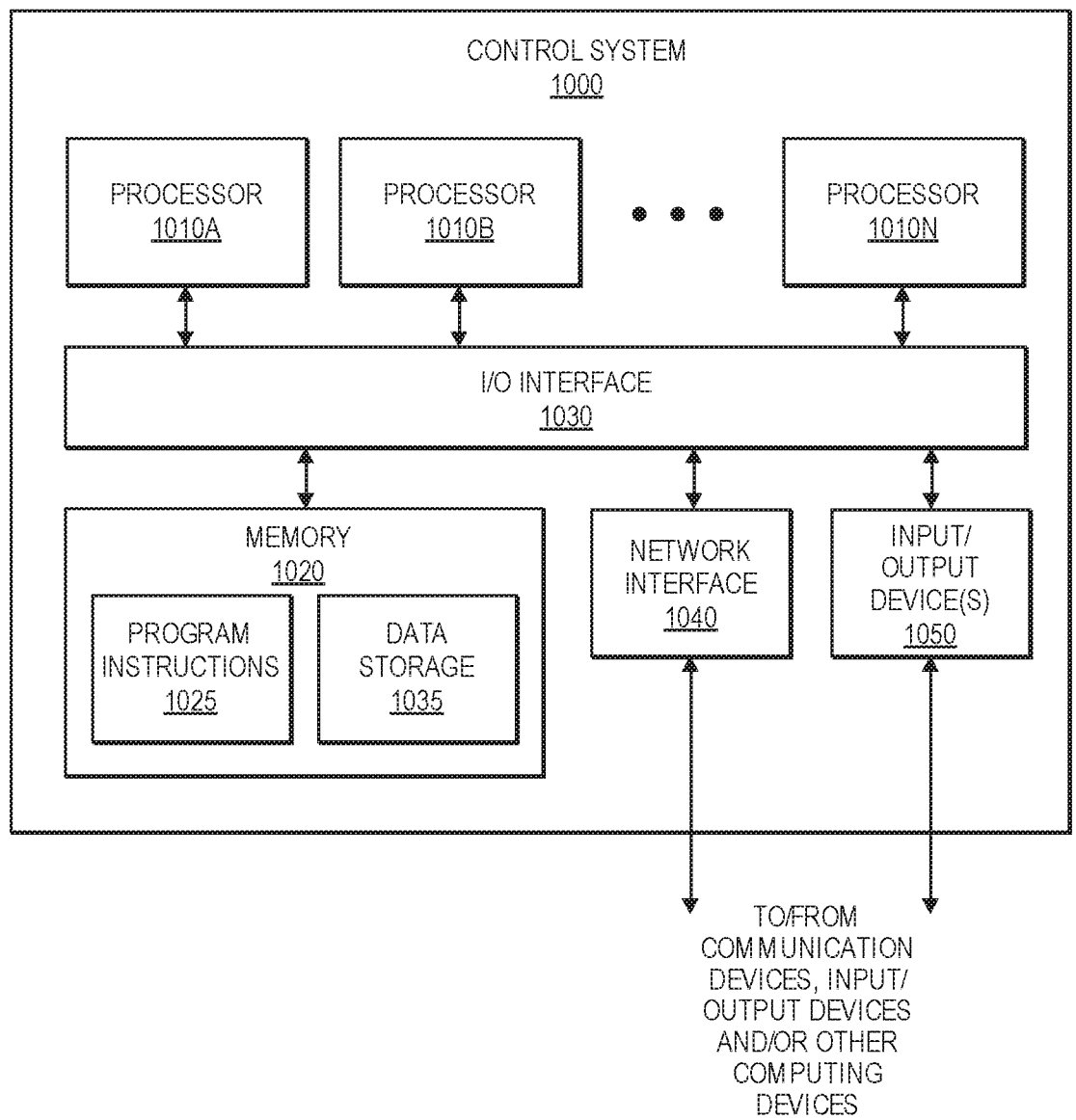
FIG. 10 is a block diagram illustrating an example control system, in accordance with implementations of the present disclosure.

FIG. 10 is a block diagram illustrating an example control system 1000, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 10. In the illustrated implementation, a control system 1000 includes one or more processors 1010A, 1010B through 1010N, coupled to a non-transitory computer-readable storage medium 1020 via an input/output (I/O) interface 1030. The control system 1000 further includes a network interface 1040 coupled to the I/O interface 1030, and one or more input/output devices 1050. In some implementations, it is contemplated that a described implementation may be implemented using a single instance of the control system 1000 while, in other implementations, multiple such systems or multiple nodes making up the control system 1000 may be configured to host different portions or instances of the described implementations. For example, in one implementation, some data sources or services (e.g., related to portions of container movement, storage, or retrieval systems, operations, or processes, etc.) may be implemented via one or more nodes of the control system 1000 that are distinct from those nodes implementing other data sources or services (e.g., related to other portions of container movement, storage, or retrieval systems, operations, or processes, etc.).

In various implementations, the control system 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various implementations, the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer-readable storage medium 1020 may be configured to store executable instructions and/or data accessible by the one or more processors 1010A-1010N. In various implementations, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1020 as program instructions 1025 and data storage 1035, respectively. In other implementations, program instructions and/or data may be received, sent or stored upon different types of computer-accessible media, such as non-transitory media, or on similar media separate from the non-transitory computer-readable storage medium 1020 or the control system 1000. Generally speaking, a non-transitory, computer-readable storage medium may include storage media or memory media such as magnetic or optical media, e.g., disk or CD/DVD-ROM, coupled to the control system 1000 via the I/O interface 1030. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1040.

In one implementation, the I/O interface 1030 may be configured to coordinate I/O traffic between the processors 1010A-1010N, the non-transitory computer-readable storage medium 1020, and any peripheral devices, including the network interface 1040 or other peripheral interfaces, such as input/output devices 1050. In some implementations, the I/O interface 1030 may perform any necessary protocol, timing or other data transformations to convert data signals from one component (e.g., non-transitory computer-readable storage medium 1020) into a format suitable for use by another component (e.g., processors 1010A-1010N). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer-readable storage medium 1020, may be incorporated directly into the processors 1010A-1010N.

The network interface 1040 may be configured to allow data to be exchanged between the control system 1000 and other devices attached to a network, such as other control systems, material handling system controllers, robotic drive units, robotic drive unit controllers or management systems, warehouse management systems, other computer systems, various types of actuators, various types of sensors, various types of vision systems, imaging devices, or imaging sensors, upstream stations or processes, downstream stations or processes, other material handling systems or equipment, or between nodes of the control system 1000. In various implementations, the network interface 1040 may support communication via wired or wireless general data networks, such as any suitable type of Ethernet network.

Input/output devices 1050 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1000. Multiple input/output devices 1050 may be present in the control system 1000 or may be distributed on various nodes of the control system 1000. In some implementations, similar input/output devices may be separate from the control system 1000 and may interact with one or more nodes of the control system 1000 through a wired or wireless connection, such as over the network interface 1040.

As shown in FIG. 10, the memory 1020 may include program instructions 1025 that may be configured to implement one or more of the described implementations and/or provide data storage 1035, which may comprise various tables, data stores and/or other data structures accessible by the program instructions 1025. The program instructions 1025 may include various executable instructions, programs, or applications to facilitate container movement, storage, or retrieval operations and processes described herein, such as robotic drive unit controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 1035 may include various data stores for maintaining data related to systems, operations, or processes described herein, such as robotic drive units, robotic drive unit data, actuators, actuator data, sensors, sensor data, vision systems or imaging devices, imaging data, mobile containers, mobile container data, items, packages, or objects, item, package, or object data, material handling equipment or apparatus, upstream systems, stations, or processes, downstream systems, stations, or processes, etc.

Those skilled in the art will appreciate that the control system 1000 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 9, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A self-positioning swivel caster, comprising:
a lower cam associated with a swivel caster frame having a rotatable caster wheel, the lower cam coupled to and configured to rotate with the swivel caster frame around an axis associated with a shaft that is coupled to a base, wherein a first vertical distance between the lower cam and the base is fixed during rotation of the swivel caster frame around the axis;
an upper cam slidably coupled to the shaft and configured to move vertically toward or away from the lower cam along the axis associated with the shaft, wherein a second vertical distance between the upper cam and the base is variable during vertical movement of the upper cam along the axis; and
a bias element configured to apply a force to bias the upper cam toward the lower cam;
wherein the lower cam and the upper cam define a home position associated with the self-positioning swivel caster.

2. The self-positioning swivel caster of claim 1, wherein the bias element comprises at least one of a compression spring, a tension spring, or a torsion spring.

3. The self-positioning swivel caster of claim 1, wherein the lower cam includes a first mating surface around a periphery of the lower cam including at least one angled portion facing the upper cam;
wherein the upper cam includes a second mating surface around a periphery of the upper cam including at least one angled portion facing the lower cam; and
wherein the first and second mating surfaces define the home position associated with the self-positioning swivel caster.

4. The self-positioning swivel caster of claim 3, wherein the first mating surface around the periphery of the lower cam includes a first peak and a first valley associated with the at least one angled portion facing the upper cam;
wherein the second mating surface around the periphery of the upper cam includes a second peak and a second valley associated with the at least one angled portion facing the lower cam; and
wherein the first peak is aligned with the second peak and the first valley is aligned with the second valley in the home position associated with the self-positioning swivel caster.

5. The self-positioning swivel caster of claim 3, wherein the force applied by the bias element to the upper cam causes rotation of the lower cam based on the first and second mating surfaces of the lower cam and the upper cam that define the home position.

6. The self-positioning swivel caster of claim 3, wherein the first mating surface of the lower cam and the second mating surface of the upper cam include angled portions having a constant slope.

7. The self-positioning swivel caster of claim 3, wherein the first mating surface of the lower cam and the second mating surface of the upper cam include a plurality of angled portions having different slopes.

8. The self-positioning swivel caster of claim 3, wherein a torque required to rotate the swivel caster frame around the axis associated with the shaft is based at least in part on the force applied by the bias element and a slope associated with angled portions of the first and second mating surfaces.

9. The self-positioning swivel caster of claim 8, wherein the torque is sufficient to prevent rotation of the swivel caster frame around the axis associated with the shaft responsive to the self-positioning swivel caster being associated with a mobile container that is positioned on a surface having a slope of up to approximately 5 degrees relative to horizontal.

10. The self-positioning swivel caster of claim 1, wherein an axis of rotation of the rotatable caster wheel is perpendicular to and offset from the axis associated with the shaft.

11. An apparatus, comprising:
a receptacle configured to receive items; and
at least one self-positioning swivel caster rotatably coupled to a shaft of the receptacle;
wherein the at least one self-positioning swivel caster comprises:
a lower cam associated with a swivel caster frame having a rotatable caster wheel, the lower cam coupled to and configured to rotate with the swivel caster frame around an axis associated with the shaft that is coupled to a base of the receptacle, wherein a first vertical distance between the lower cam and the base is fixed during rotation of the swivel caster frame around the axis;
an upper cam slidably coupled to the shaft and configured to move vertically toward or away from the lower cam along the axis associated with the shaft, wherein a second vertical distance between the upper cam and the base is variable during vertical movement of the upper cam along the axis; and
a bias element configured to apply a force to bias the upper cam toward the lower cam;
wherein the lower cam and the upper cam define a home position associated with the self-positioning swivel caster.

12. The apparatus of claim 11, wherein the lower cam includes a first mating surface around a periphery of the lower cam including at least one angled portion facing the upper cam, and the upper cam includes a second mating surface around a periphery of the upper cam including at least one angled portion facing the lower cam, the first and second mating surfaces defining the home position; and
wherein the force applied by the bias element to the upper cam causes rotation of the lower cam based on the first and second mating surfaces of the lower cam and the upper cam that define the home position.

13. The apparatus of claim 12, wherein the first mating surface around the periphery of the lower cam includes a first peak and a first valley associated with the at least one angled portion facing the upper cam; and
wherein the second mating surface around the periphery of the upper cam includes a second peak and a second valley associated with the at least one angled portion facing the lower cam.

14. The apparatus of claim 13, wherein in the home position, the first peak is aligned with the second peak, and the first valley is aligned with the second valley.

15. The apparatus of claim 11, wherein the lower cam is integrally formed with the swivel caster frame; and
wherein the upper cam is one of keyed or splined to the shaft.

16. The apparatus of claim 11, wherein the at least one self-positioning swivel caster comprises at least two self-positioning swivel casters rotatably coupled to respective shafts of the receptacle and having respective home positions.

17. The apparatus of claim 16, wherein the respective home positions of the at least two self-positioning swivel casters are angled between approximately 30-150 degrees relative to each other.

18. The apparatus of claim 16, wherein the respective home positions of the at least two self-positioning swivel casters increase clearance under the receptacle.

19. The apparatus of claim 16, wherein the respective home positions of the at least two self-positioning swivel casters prevent drift of the receptacle.

20. The apparatus of claim 11, wherein the at least one self-positioning swivel caster comprises four self-positioning swivel casters rotatably coupled to respective shafts at respective corners of the receptacle and having respective home positions.

\* \* \* \* \*